3,389,897
METHOD OF OPERATING A HOT BLAST CUPOLA FURNACE

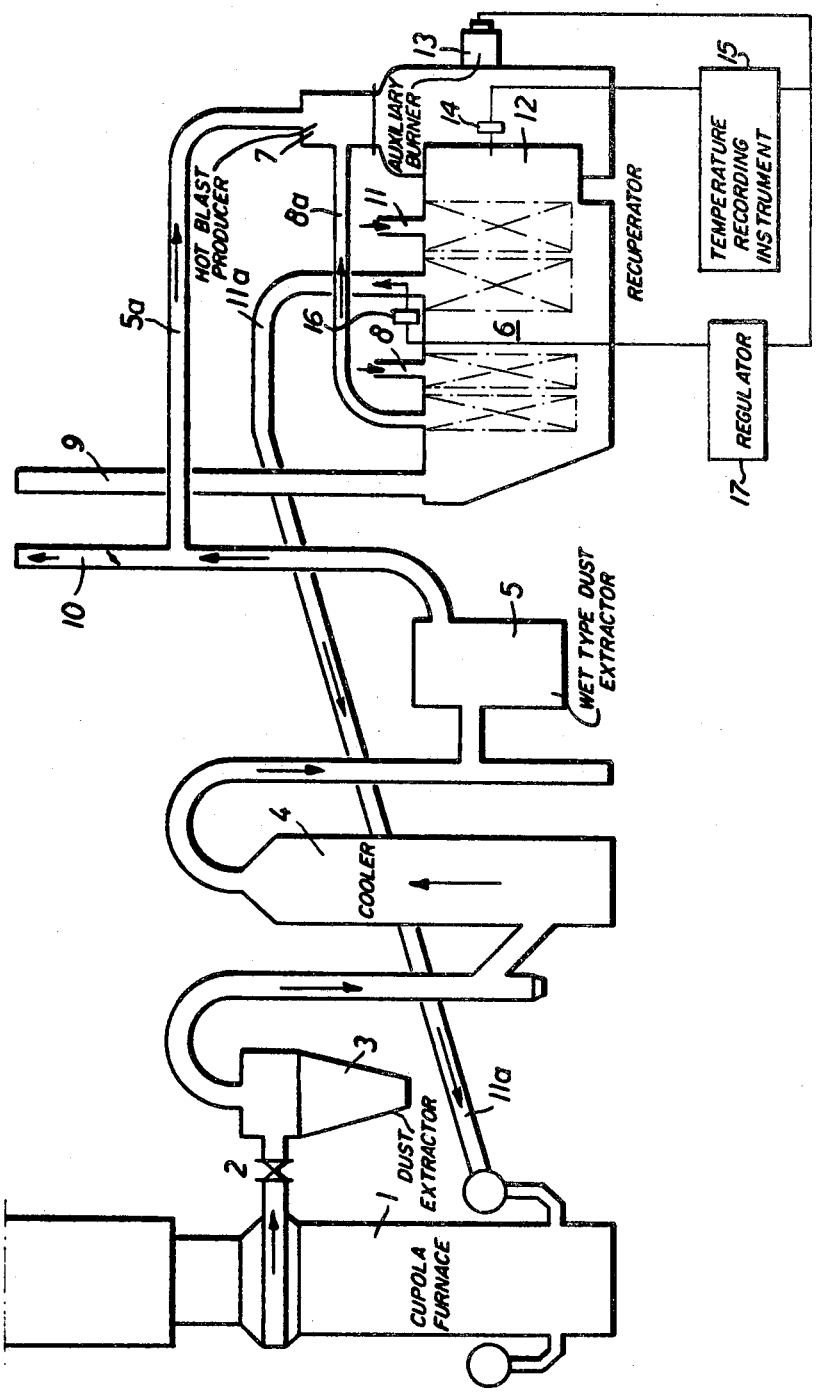

Siegfried Tunder, Dusseldorf-Nord, and Gerhard Schefels, Dusseldorf, Germany, assignors to Gesellschaft für Huttenwerksanlagen m.b.H., and Rekuperator K.G. Dr.- Ing. Schack & Co., Dusseldorf, Germany
Filed Oct. 12, 1965, Ser. No. 495,218
Claims priority, application Germany, June 28, 1965, G 44,003
1 Claim. (Cl. 263—52)

ABSTRACT OF THE DISCLOSURE

A method of operating a hot blast cupola furnace involves the steps of burning the dust free waste gases of the furnace in a hot blast producer together with combustion air that has been preheated by passage through the producer, supplying additional heat to the producer from an auxiliary burner when the temperature of the hot blast air falls below a certain minimum, and recording the operating temperature of the hot blast producer, or measuring it, so that when the operating temperature is normal, the auxiliary burner will automatically be deactivated.

---

This invention relates to a method of operating a hot blast cupola furnace plant in which the furnace gases are drawn off, utilised, and purified. Furnace gases of low calorific value which are obtained are also purified in a dust extraction plant working by a wet method after being drawn off from the cupola furnace, and the wet-cleaned gases are then utilised for producing the hot blast.

Production of hot blast for cupola furnaces use is by means of recuperators, which are heated either with gas from the cupola furnace or with town or natural gas, that is to say heated by an external source. The question of the type of heating to be selected is a matter for economic considerations, which is decided by capital and operating costs. Recuperator plants of smaller power are preferably operated with external heating because the cost of the plant is then lower. Larger plants are mainly heated with cupola furnace gas. The calorific value of the furnace gases produced has hitherto been sufficient for producing the hot blast and the amount of heat available was generally larger than that required. The construction of a hot blast cupola furnace plant is relatively simple and sufficiently known from technical literature.

Requirements imposed by the authorities that blast furnace gases from cupola furnaces must be free from dust has resulted in a number of problems, due mainly to the incorporation of effective dust extraction equipment, that is to say dust extraction equipment operating with high efficiency, in the hot blast cupola furnace plants which in themselves have been fully developed. Filter units work at temperatures which are generally below the temperatures of the blast furnace gases withdrawn from the cupola furnace, so that gas coolers are indispensible. Dry as distinct from wet operating filters permit higher operating temperatures, but are either considerably more expensive to instal, as e.g. in the case of dry electrofilters, or considerably more expensive to operate, as e.g. in the case of cyclones, or else require considerable more space, such as fabric filters. In addition, in cupola furnace plants provided with dry filters, risk of explosion in the entire system is considerable unless it is equipped with the necessary safety devices in accordance with German Patent No. 1,128,952. It is for these reasons that wet operating gas cleaners are generally preferred in foundries of small and medium size.

The operating temperatures of such wet dust extractors are on an average between 20° C. to 70° C. The cupola furnace gases from the furnace must therefore be cooled to temperatures of this order. After passing out of the extractor they are saturated with water vapour. The CO content of the blast furnace gases, usually from 12 to 14% (dry gas), does not remain constant but is often reduced either through the operation of the furnace (coke rate, type of coke, amount of blast and so on), disturbances in operating the furnace, interruptions in operation, and so on, to 10% or less. Through the absorption of water vapour, this carbon monoxide content, which is already low, is still further reduced. The calorific value of the gas is then about 300 kilocalories per normal cubic metre or less, particularly as the sensible heat is practically completely removed by cooling in the gases from the furnace. It is however particularly disadvantageous that the gases under these conditions are no longer combustible.

Because of for these reasons it has hitherto not been considered possible, or only under very great difficulties, to utilise wet cleaned cupola furnace gases for operating the cupola furnace itself. The remedly has been to dispose the wet dust cleaning plant downstream of the recuperator, that is to say to clean the gases on leaving the latter. The recuperator was then operated with uncleaned gases containing a high proportion of dust. The disadvantage in operating in this manner are obvious: frequent cleaning of the recuperator is required. Because of accumulations of dust on the heat exchange surfaces, the thermal efficiency of the recuperator is reduced. The dust extraction apparatus itself must be made larger because gases which are burned (generally with excess of air) require a larger volume and moreover in many cases the gases on leaving the recuperator have considerably higher temperatures than the furnace gases direct from the cupola furnace, that is to say require more cooling.

Attempts have been made to preheat the blast furnace gas from a wet dust extractor preceding the recuperator, before entering the latter. The degree of preheating depends on the CO content of the gas. It is therefore not constant. In the case of gas having a low CO content the temperature must be 500° C. or higher.

In this condition the gases are just still combustible, so that they can be used in a recuperator for producing hot blast. This method of utilising the gases however has the disadvantage that although on leaving the wet dust extractor, the blast furnace gases, it is true, are cleaned, they still contain at least 0.1 to 0.2 gram of dust per normal cubic metre. In conjunction with the water present, this residual dust content leads to the formation of sludge after some time during the preheating, and also to the clogging of the heating elements of the recuperator. Moreover, in addition to the recuperator for producing the hot blast another apparatus is required for preheating and drying the blast furnace gas, thus adding not inconsiderably to the capital costs.

The underlying object of the present invention is to enable all the blast furnace gas produced in a hot blast cupola plant, even that having a low and fluctuating calorific value, to be cleaned in a dust extraction plant operating by the wet method and to enable it to be utilised in the production of the hot blast in an operationally simpler and more reliable manner, while ensuring a constant hot blast temperature despite the fluctuating CO contents in the gas.

This aim is achieved according to this invention firstly by heating the recuperator, depending on requirements and operating conditions, either only with oil, natural gas, or town gas or only with blast furnace gas, or else with oil and blast furnace gas, and secondly, not by pre-heating the blast furnace gas but by preheating the air for combustion in order to make possible reliable combustion of the blast furnace gas.

The following advantages are then gained:

The combustion of blast furnace gases of interior quality is made possible by preheating the air for combustion. The above described disadvantages of preheating the blast furnace gas are avoided.

The preheating of the air for combustion is independent of the fluctuating CO content of the blast furnace gases produced. It is effected in a part downstream of the main recuperator through the heat of the outgoing gases of the latter or by an additional burner which can be brought into operation as required. The preheating of the air for combustion can be adjusted to a fixed value, for example at a temperature of 450° C. The hot blast temperature can be kept constant in the same manner, namely by putting into or out of action an additional burner to raising the combustion chamber temperature of the recuperator.

The heating of the recuperator can be checked in the simplest manner by means of temperature measuring instruments and controlled automatically with the aid of regulators.

Smokeless operation with 100% extraction of gas and outgoing gases cleaned in accordance with the regulations is thus ensured.

By installing the dust extractor upstream of the recuperator, the latter is heated with cleaned gas, so that it cannot become dirty. Its thermal efficiency is therefore very great. Since in normal operation outside heating is not applied or outside energy is supplied only for short times in the event of disturbances, operating costs for the process according to the invention are low. The accompanying drawing is a diagrammatic layout of a plant for carrying out the method according to the invention is illustrated diagrammatically in the drawing:

1 indicates a coupola furnace from which the gases produced are extracted in known manner through a blast furnace gas barrier 2 and after passage through a coarse dust extractor 3 the gases enter a cooler 4 to remove the sensible heat to enable them to be fed to a wet type dust extractor 5.

Any desired forms of gas cleaners of this type may be used, for example wet electrofilters, Theisen disintegrators, venturi scrubbers, and so on.

The gas, which has been cleaned to a residual dust content of e.g. 100–200 mg. per normal cubic metre is passed to a recuperator 12. The inlet for cold blast air into the recuperator is at 11 and it leaves it through a pipe 11a as hot blast for the cupola furnace 1. Air for combustion is introduced at 8 into the downstream part of the recuperator which it leaves through a pipe 8a as preheated air at a temperature of about 450° C. This preheated air is then used in a hot blast producer 7 for the combustion of the cold, cleaned blast furnace gas arriving via the pipe 5a.

The temperature of the combustion of fire chamber of the recuperator is continuously measured and recorded by means of a thermocouple 14 and a temperature recording instrument 15. Should the temperature drop, for example through variation in the furnace operating conditions, disturbances, or interruptions to operation, below the required value of e.g. 800° C., an auxiliary burner 13, burning oil, natural or town gas, 13 is automatically brought into action by a regulating circuit. This burner supplies the missing heat until such time as the temperature in the recuperator has reached the desired value. It is then automatically switched off.

Alternatively, control of the oil burner 13 may be made dependent on the hot blast temperature the control of the oil burner 13 is carried out by means of a thermocouple 16 in the pipe 11a, and a regulator 17. The outgoing gases of the recuperator pass through the chimney 9 to atmosphere.

In the event of a breakdown in the filter ration and for dust cleaners, the blast furnace gases which have not been cleaned or only partly cleaned pass through a pipe 10 into the open. In the event of the CO content of the blast furnace gas becoming high in consequence of an alteration of the furnace operating conditions, so that there is an excess of blast furnace gas available beyond that required for producing the hot blast, it may be branched off for other purposes through the pipe 10.

When starting up the plant the recuperator is heated only with oil. After only a short time it can be changed over to heating wtih blast furnace gas.

What we claim is:

1. A method of operating a hot blast cupola furnace plant which includes a hot blast producer and a dust extractor of the wet type through which the waste gases from the furnace are passed, which comprises the steps of
    (1) burning the dust free waste gases in the hot blast producer together with combustion air preheated by passage through the downstream end of the producer.
    (2) supplying additional heat to the hot blast producer from an auxiliary burner when the temperature of the hot blast air falls below a predetermined minimum, and
    (3) recording the operating temperature of the and/or measuring hot blast producer so that when the operating temperature is normal the auxiliary burner is automatically placed out of action.

References Cited

UNITED STATES PATENTS

| | | | |
|---|---|---|---|
| 2,142,100 | 1/1939 | Avery | 266—25 XR |
| 2,602,027 | 7/1952 | Old | 266—25 XR |
| 2,729,301 | 1/1956 | Ekstrom. | |
| 2,761,671 | 9/1956 | Tinker | 266—17 |

FREDERICK L. MATTESON JR., *Primary Examiner.*

J. SPENCER OVERHOLSER, *Examiner.*

E. MAR, A. D. HERRMANN, *Assistant Examiners.*